3,767,690
ORGANOSILICON CINNAMATES
John L. Speier, Midland, Mich., assignor to Dow Corning Corporation, Midland, Mich.
No Drawing. Filed Nov. 22, 1971, Ser. No. 201,188
Int. Cl. C07f 7/10, 7/18
U.S. Cl. 260—448.2 N                                    2 Claims

ABSTRACT OF THE DISCLOSURE

Silanes and siloxanes containing the group $$\equiv SiR'S(CH_2)_3OOCCH=CHC_6H_5$$

are prepared by the addition of allyl cinnamate to the corresponding mercapto silane or siloxane. The compositions are useful as sunscreen agents in protective coatings and in cosmetic applications.

---

Attempts to prepare siloxanes having an ester substituent attached to silicon by the addition of an allyl ester of a carboxylic acid to an SiH containing siloxane, generally result in the formation of large amounts of propylene and the formation of SiOOCR groups. It has been found, however, that quantitative yields of the desired ester are obtained when one employs a mercapto siloxane in place of the SiH containing siloxane.

It is the object of this invention to provide cinnamate modified silanes and siloxanes in good yields which materials are excellent sunscreen agents for cosmetic and other applications.

This invention relates to compounds of the formula (1) $\quad X_{3-n}R_nSiR'S(CH_2)_3OOCCH=CHC_6H_5$ (2) $\quad \dfrac{O_{3-n-m}}{2}X_mR_nSiR'S(CH_2)_3OOCCH=CHC_6H_5$ and copolymers containing at least one (2) unit, the remaining siloxane units in said copolymer being of the formula $$\dfrac{R''_aSiO_{4-a}}{2}$$

in which

X is a hydrolyzable [1] group free of carbon-carbon aliphatic unsaturation or an OH group,
R is a monovalent hydrocarbon or a monovalent halohydrocarbon radical free of aliphatic unsaturation,
R' is a divalent hydrocarbon radical of 1 to 18 carbon atoms, free of aliphatic unsaturation or a silacyclopentane radical,
R'' is a monovalent hydrocarbon or halohydrocarbon radical, a hydrolyzable group, an H atom or OH,
n is an integer from 0 to 2,
m is an integer from 0 to 2, the sum of m+n being not greater than 2, and
a is an integer from 0 to 3.

The compositions of this invention are prepared by reacting allyl cinnamate with a silane or siloxane containing the SiR'SH group in the presence of a free radical generator such as peroxides, such as benzoyl peroxide, azonitriles such as azo-bis-isobutyronitrile, ultraviolet light or heat.

The compositions can be silanes, homopolymeric siloxanes in which each silicon has a cinnamate group attached thereto, copolymeric siloxanes in which each silicon atom has a cinnamate group attached thereto and copolymers

---

[1] The term hydrolyzable group means one which reacts with water at room temperature to produce ≡SiOH and XH.

in which at least one silicon atom has a cinnamate group attached thereto and the remaining silicon atoms do not. When Z represents the —R'S(CH$_2$)$_3$OOCCH=CHC$_6$H$_5$ group, the siloxane units within the scope of this invention are ZSiO$_{1.5}$, ZR$_2$SiO$_{.5}$, ZRSiO, ZXSiO, ZX$_2$SiO$_{.5}$ and ZRXSiO$_{.5}$, and copolymers of any combination of the above with each other and copolymers of any combination of the above with siloxane units to the formula R''$_3$SiO$_{.5}$, R''$_2$SiO, R''SiO$_{1.5}$ and SiO$_2$ units. Thus the siloxanes of this invention can be in the form of fluids, rubbers or resins.

For the purpose of this invention X can be any hydrolyzable group such as organic groups free of aliphatic unsaturation such as alkoxy radicals such as methoxy, ethoxy, isopropoxy, octadecyloxy, cyclohexyloxy, cyclopentyloxy, beta-methoxy ethoxy, beta-ethoxy ethoxy, or CH$_3$O(CH$_2$CH$_2$O)$_n$— where n is 2 or 3; aryloxy radicals such as phenoxy, tolyloxy, or naphthyloxy; acyloxy radicals such as formyloxy, acetoxy, propionyloxy, or hexoyloxy; ketoxime radicals of the formula —ON=CA$_2$ in which A is a hydrocarbon or halohydrocarbon radical such as methyl, ethyl, octadecyl, cyclohexyl, cyclopentyl, chloroethyl, chlorophenyl, etc.; amino radicals of the formula —NA$_2$ where A is above defined; amineoxy radicals of the formula ONA$_2$ where A is above defined; and amido radicals of the formula —NHOCA where A is as above defined and inorganic hydrolyzable groups such as halogen atoms such as chlorine, bromine, iodine or fluorine or the sulphate radical.

For the purpose of this invention R can be any monovalent hydrocarbon or halohydrocarbon radical free of aliphatic unsaturation such as alkyl radicals such as methyl, ethyl, isopropyl, or octadecyl; cycloaliphatic radicals such as cyclohexyl, cyclopentyl, or methylcyclohexyl; aryl hydrocarbon radicals such as phenyl, naphthyl, xenyl, tolyl, or xylyl and aralkyl radicals such as benzyl, beta-phenyl ethyl or beta-phenyl propyl. R can also be any halogenated monovalent hydrocarbon radical such as trifluoropropyl, chloropropyl, iodomethyl, chlorophenyl, dibromophenyl, fluorophenyl, chloronaphthyl, or hexachloroxenyl.

For the purpose of this invention R' can be any divalent hydrocarbon radical such as methylene, dimethylene, trimethylene, octadecamethylene, isobutylene,

—CH$_2$CH$_2$C$_6$H$_4$—, phenylene, naphthylene, tolylene, cyclohexylene, or cyclopentylene.

For the purpose of this invention R'' can be any monovalent hydrocarbon or halohydrocarbon radical such as those shown for R above and in addition R'' can be any alkenyl radical such as vinyl, allyl, hexenyl, or any cycloalkenyl radical such as cyclohexenyl or cyclopentenyl. In addition R'' can be any of the hydrolyzable groups shown for X above and it can be the hydrogen atom or a hydroxyl radical.

The mercapto silanes and siloxanes used as starting materials for this invention are well known materials as exemplified by such U.S. Pats. as 3,465,015 and 3,590,065, French Pats. such as 2,056,526 and 2,056,527 and the copending application of Gary E. LeGrow, Ser. No. 54,532, filed July 13, 1970, entitled, "Silacyclopentane Thiols and Thiolates," now Pat. No. 3,655,713. All of these patents and the copending application are hereby incorporated in this disclosure by reference.

The compositions of this invention can be used in the preparation of cosmetic materials and thereby increase the resistance of the skin to solar radiation. They can also be incorporated in protective coatings such as paints in order to increase the life of those coatings and to prolong the life of the substrate protected thereby.

The following examples are illustrative only and should not be construed as limiting the invention which is properly delineated in the appended claims.

EXAMPLE 1

To 2500 ml. of rapidly stirred water was added a mixture of 217 g. of trimethyl monochloro silane, 480 g. of dimethyl dimethoxy silane and 180 g. of 3-mercaptopropyl methyl dimethoxy silane over a period of 1 hour. An exotherm to 45° C. occurred. The reaction mixture was cooled, separated and the organic layer was washed with water until acid-free and dried over anhydrous sodium sulphate. The water-white product had the properties viscosity 3.12 cs. and $N_D^{25}$ of 1.4135. Tests with nuclear magnetic resonance showed it to be the expected mercapto propyl siloxane copolymer.

147 g. of the fluid prepared above was mixed with 47 g. of allyl cinnamate and 0.25 g. of azo-bis-isobutyronitrile. The mixture was heated and stirred for 24 hours at 80° C. Color developed in the product but was removed with an activated charcoal treatment followed by filtration. The low boiling species were removed by heating at 50° C. at 1 mm. pressure giving 150 gm. of a fluid having a viscosity of 50 cs. This was shown by nuclear magnetic resonance to be of the formula

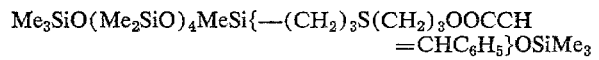

$Me_3SiO(Me_2SiO)_4MeSi\{-(CH_2)_3S(CH_2)_3OOCCH=CHC_6H_5\}OSiMe_3$

Ultraviolet absorption was run on the fluid and the results are as follows:

| Lambda max. mµ: | Epsilon |
| --- | --- |
| 333 | 456 |
| 272 | 15620 |
| 221 | 13550 |
| 215 | 17180 |

EXAMPLE 2

The following cinnamates are obtained when the following mercaptans are reacted with allylcinnamate in accordance with the procedure of Example 1. Y represents the $-(CH_2)_3OOCCH=CHC_6H_5$ radical. The following abbreviations are used below: Me for methyl, Et for ethyl, Bu for butyl, Ph for phenyl and Vi for vinyl.

Mercaptans (MeO)₃SiCH₂SH
(EtO)₂PhSi(CH₂)₁₈SH
(MeCOO)Et₂SiCH₂CH₂SH (PbC₆H₄)(Me)(HO)SiCH₂CHCH₂SH
              |
              Me (Me₂C=NO)₃SiC₆H₄SH (MeOCH₂CH₂O)₂SiC₆H₁₁SH with CH₂CH₂CF₃ branch (Et₂NO)₂SiCH₂CH₂CH₂SH with CH₂CH₂CH₂Cl branch (MeCONH)₂(C₁₈H₃₇)SiCH₂CH₂C₆H₄SH
(Bu₂N)₂(C₆H₁₁)SiC₁₀H₇SH
Cl₂(Br₃C₆H₂)Si(CH₂)₃SH

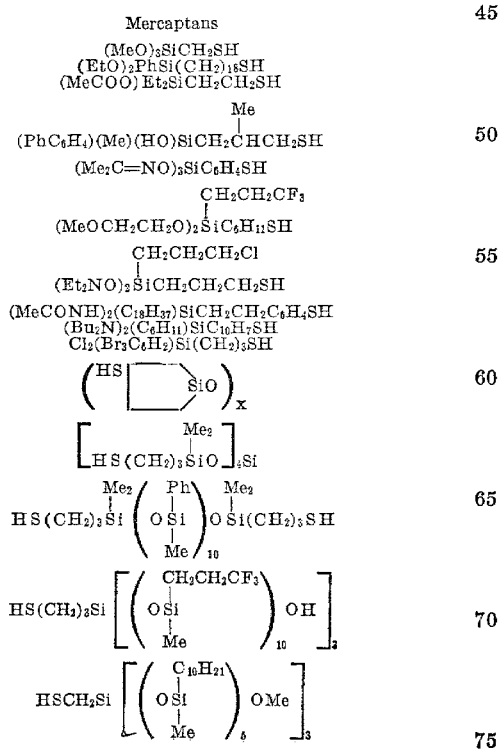

Copolymer of 10 mol percent HS(CH₂)₃SiO₁.₅
20 mol percent MeSiO₁.₅
30 mol percent PhSiO₁.₅
20 mol percent Ph₂SiO
20 mol percent Me₂SiO copolymer of 10 mol percent HS(CH₂)₃SiO₁.₅
5 mol percent ViSiO₁.₅
20 mol percent C₆H₁₁SiO₁.₅
10 mol percent PhC₆H₄SiO₁.₅
20 mol percent PhMeSiO
35 mol percent Me₂SiO

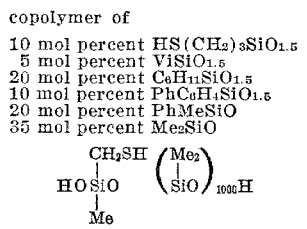

Cinnamates (MeO)₃SiCH₂SY
(EtO)₂PhSi(CH₂)₁₈SY
(MeCOO)Et₂SiCH₂CH₂SY (PhC₆H₄)(Me)(HO)SiCH₂CHCH₂SY
              |
              Me (Me₂C=NO)₃SiC₆H₄SY (MeOCH₂CH₂O)₂SiC₆H₁₁SY with CH₂CH₂CF₃ branch (Et₂NO)₂SiCH₂CH₂CH₂SY with CH₂CH₂CH₂Cl branch (MeCONH)₂(C₁₈H₃₇)SiCH₂CH₂C₆H₄SY
(Bu₂N)₂(C₆H₁₁)SiC₁₀H₇SY
Cl₂(Br₃C₆H₂)Si(CH₂)₃SY

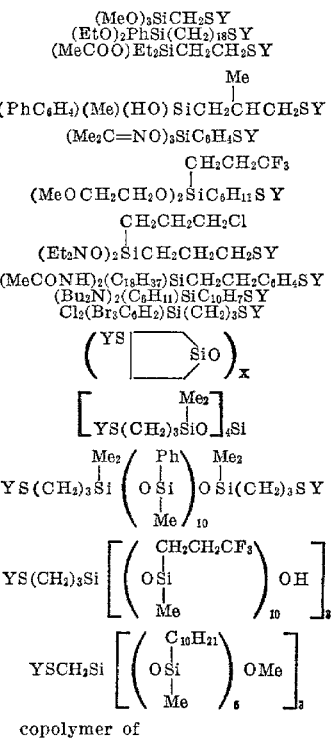

copolymer of 10 mol percent YS(CH₂)₃SiO₁.₅
20 mol percent MeSiO₁.₅
30 mol percent PhSiO₁.₅
20 mol percent Ph₂SiO
20 mol percent Me₂SiO copolymer of 10 mol percent YS(CH₂)₃SiO₁.₅
5 mol percent ViSiO₁.₅
20 mol percent C₆H₁₁SiO₁.₅
10 mol percent PhC₆H₄SiO₁.₅
20 mol percent PhMeSiO
35 mol percent Me₂SiO

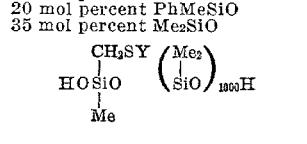

EXAMPLE 3

When a mixture of 5 mol percent $(MeO)_3Si(CH_2)_3SY$, 15 mol percent Me₃SiCl, 15 mol percent MeHSi(OMe)₂ and 65 mol percent Me₂Si(OMe)₂ is cohydrolyzed and cocondensed the polymer

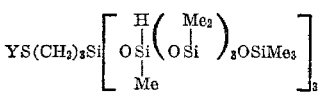

is obtained. It should be understood that the formula is an idealized structure. Y is the group $C_6H_5CH=CHCOO(CH_2)_3-$ That which is claimed is:
1. A composition of matter selected from the group consisting of (1) $X_{3-n}R_nSiR'S(CH_2)_3OOCCH=CHC_6H_5$ (2) 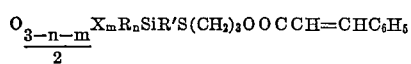$X_mR_nSiR'S(CH_2)_3OOCCH=CHC_6H_5$ and
(3) copolymers containing at least one

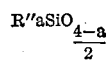$X_mR_nSiR'S(CH_2)_3OOCCH=CHC_6H_5$ unit, the remaining siloxane units in said copolymer being of the unit formula $$R''_aSiO_{\frac{4-a}{2}}$$

in which

X is a hydrolyzable group free of carbon-carbon aliphatic unsaturation or an OH group, R is a monovalent hydrocarbon or halohydrocarbon radical free of aliphatic unsaturation, R' is a divalent hydrocarbon radical of 1 to 18 carbon atoms, free of aliphatic unsaturation or a silacyclopentane radical, R'' is a monovalent hydrocarbon or halohydrocarbon radical, a hydrolyzable group, a hydrogen atom or OH, X, R and R'' containing from 1 to 18 carbon atoms, $n$ is an integer from 0 to 2, $m$ is an integer from 0 to 2, the sum of $m+n$ being not greater than 2, and $a$ is an integer from 0 to 3.

2. A copolymer of claim 1 in which $m$ is 0, R is methyl, $n$ is 1, R' is —$(CH_2)_3$—, R'' is methyl and $a$ is 2 or 3.

References Cited
UNITED STATES PATENTS 3,296,196  1/1967  Lamoreaux ........ 260—46.5 G
3,661,954  5/1972  LeGrow .......... 260—448.2 N PATRICK P. GARVIN, Primary Examiner P. F. SHAVER, Assistant Examiner U.S. Cl. X.R.

106—287 SB; 260—46.5 E, 46.5 G, 448.2 B, 448.8 R, 424—59